(12) United States Patent
Broghammer

(10) Patent No.: US 9,147,545 B2
(45) Date of Patent: Sep. 29, 2015

(54) CIRCUIT BREAKER IDENTIFICATION ACCESSORY

(75) Inventor: William J. Broghammer, Anamosa, IA (US)

(73) Assignee: Schneider Electric USA, Inc., Palatine, IL (US)

( * ) Notice: Subject to any disclaimer, the term of this patent is extended or adjusted under 35 U.S.C. 154(b) by 438 days.

(21) Appl. No.: 13/440,079

(22) Filed: Apr. 5, 2012

(65) Prior Publication Data

US 2013/0264180 A1    Oct. 10, 2013

(51) Int. Cl.
*H01H 71/06* (2006.01)
*H02B 1/42* (2006.01)
*H01H 9/18* (2006.01)

(52) U.S. Cl.
CPC .......... *H01H 71/06* (2013.01); *H01H 2009/188* (2013.01); *H02B 1/42* (2013.01)

(58) Field of Classification Search
USPC .................... D13/139.8; 335/202; D8/350
See application file for complete search history.

(56) References Cited

U.S. PATENT DOCUMENTS

| | | | |
|---|---|---|---|
| 3,213,241 A | 10/1965 | Gelzheiser et al. | |
| 3,398,249 A | 8/1968 | Dessert | |
| 4,454,565 A | 6/1984 | Krasij | |
| 4,563,553 A | 1/1986 | Wilson et al. | |
| 4,679,120 A | 7/1987 | Raabe et al. | |
| 4,733,029 A | 3/1988 | Kobayashi et al. | |
| 4,754,247 A | 6/1988 | Raymont et al. | |
| 4,982,173 A | 1/1991 | Meiners et al. | |
| 5,027,095 A | 6/1991 | McKay et al. | |
| 5,107,396 A | 4/1992 | Rosen et al. | |
| 5,113,043 A | 5/1992 | Morris | |
| 5,126,918 A | 6/1992 | Morby et al. | |
| 5,172,300 A | 12/1992 | Morby et al. | |
| 5,349,145 A | 9/1994 | Kelaita et al. | |
| 5,467,622 A | 11/1995 | Becker et al. | |
| 5,581,218 A | 12/1996 | Bagalini et al. | |
| 5,775,481 A | 7/1998 | Lyke | |
| 5,808,532 A * | 9/1998 | DiVincenzo et al. | 335/68 |
| 5,817,998 A | 10/1998 | Siebels et al. | |
| 5,832,641 A | 11/1998 | Osterbrock et al. | |
| 5,850,705 A | 12/1998 | Groh | |
| 5,909,019 A | 6/1999 | Maloney et al. | |
| 6,062,914 A | 5/2000 | Fasano | |
| 6,366,188 B1 | 4/2002 | Hein et al. | |
| 6,396,008 B1 | 5/2002 | Maloney et al. | |
| 6,806,799 B2 | 10/2004 | Runyan | |
| 6,929,837 B2 | 8/2005 | Morrison | |
| 6,940,027 B1 | 9/2005 | Sipe | |
| 7,286,340 B2 | 10/2007 | Karim et al. | |
| 7,403,373 B2 | 7/2008 | McCoy et al. | |

(Continued)

OTHER PUBLICATIONS

Square D "QO1PAF and QOU1PAFLA Handle Lock-off Padlock Attachment Kits" Instruction Bulletin 48840-209-01 Issued 2000 (4 pages).

(Continued)

*Primary Examiner* — Joanne Silbermann
(74) *Attorney, Agent, or Firm* — Locke Lord LLP

(57) ABSTRACT

Identification accessories, circuit breaker caps, and labeling kits for labeling electrical switch devices, such as circuit breakers, are presented herein. An identification accessory is disclosed for identifying an electrical switch device in proximity to its operating mechanism. The identification accessory includes an accessory shell with a lid having first and second endwalls projecting from the lid.

19 Claims, 4 Drawing Sheets

(56) References Cited

U.S. PATENT DOCUMENTS

| | | | |
|---|---|---|---|
| 7,446,271 | B2 | 11/2008 | McCoy |
| 7,616,096 | B1 | 11/2009 | Sorensen |
| 2006/0285281 | A1 | 12/2006 | Zhang et al. |
| 2008/0277250 | A1 | 11/2008 | DeCook et al. |
| 2008/0284614 | A1 | 11/2008 | Perez et al. |
| 2009/0165349 | A1 | 7/2009 | Bura et al. |
| 2011/0042191 | A1 | 2/2011 | Turner et al. |
| 2011/0222211 | A1 | 9/2011 | Siebels et al. |
| 2012/0180349 | A1* | 7/2012 | Ekins .................. 40/553 |

OTHER PUBLICATIONS

Layer Zero Power Systems, Inc.: SafePanel Panel Board, dated Jan. 27, 2011, 3 pages.

International Search Report for International Application No. PCT/US2011/027191, dated Aug. 17, 2011 (4 pages).

Written Opinion of the International Searching Authority for International Application No. PCT/US/2011/027191, dated Aug. 17, 2011 (5 pages).

* cited by examiner

CIRCUIT BREAKER IDENTIFICATION ACCESSORY

TECHNICAL FIELD

The present disclosure relates generally to electrical distribution systems, and more particularly to electrical switching devices, such as circuit breakers, and accessories for identifying and labeling the same.

BACKGROUND

Electrical distribution panels (or "load centers") are used widely in residential and commercial applications to house and protect electrical components. These power distribution centers include a main bus bar arrangement that functions to connect the main electrical service entrance with a number of branch circuits. Breaker panels operate to divide electrical power into subsidiary circuits, while providing a protective fuse or circuit breaker for each circuit.

Electrical switching devices, such as circuit breakers and isolators, are designed to protect an electrical circuit from damage caused by a fault condition, such as an overload or short circuit, and switch the circuit to zero energy state for safe maintenance or normal on/off switching. Safety regulations, such as those published by the National Electrical Code (NEC), are being developed which require circuit breakers, especially those controlling critical circuits (e.g., fire protection circuits, emergency generator circuits, etc.), to be clearly labeled. It can also be advantageous to electricians and other users to be able to quickly identify the type of circuit being protected by a particular circuit breaker.

The current practice for labeling circuits is to describe the circuit location or loads on the label inside of the load center door with the corresponding circuit number. This is tedious, hard to read, and requires you to then go find the corresponding circuit. This can be difficult in the typical low-light environments where load centers are installed. Other practices for labeling circuit breakers include adding a piece of tape to the exposed face of the circuit breaker or breaker-panel door, and marking the tape by hand with the type of circuit to which the circuit breaker is connected. This practice is not preferred since the tape can fall off if the adhesive fails. Moreover, the handmade markings can become smudged or otherwise rendered indecipherable.

SUMMARY

Aspects of this disclosure are directed to identification accessories designed to fit the product profile that adhere to the electrical switching product with a multitude of methods. The advantage is being mounted in direct proximity to the operating mechanism, making it easy to identify with labels, molded info, or accessories of different color to make it very apparent what the operator is switching. One example includes an add-on, retrofit labeling cap designed to mount onto and categorize a circuit breaker. Optional configurations allow the user to add information (e.g., labels and/or markings) to the top of the identification accessory. This label can be marked before installation or preprinted to ensure legibility and easy updating with precut labels. Advantageously, these labeling caps secure reliably to the breaker, yet can be easily removed and replaced, for example, when the function of the circuit breaker changes or the circuit breaker is replaced. These circuit breaker labeling caps are inexpensive, durable, simple to use, easy to replace, and reliable.

In accordance with one aspect of the present disclosure, an identification accessory is disclosed for identifying an electrical switch device. The electrical switch device has a housing with a face portion and a handle projecting from the face portion. The identification accessory includes an accessory shell with a lid having first and second endwalls projecting from the lid. The accessory shell is configured to attach to the electrical switch device. The lid includes indicium that extends around the handle of the electrical switch device.

According to aspects of the present disclosure, an identification accessory is presented for identifying an electrical switch device. The electrical switch device has a housing with a face portion having a top surface extending between a pair of endwalls. Each of the endwalls includes a respective slot number. The identification accessory includes an accessory shell with a contoured face having first and second endwalls projecting from the contoured face. A first tab projects from an inside surface of the first shell endwall, and a second tab projects from an inside surface of the second shell endwall. The first and second tabs are each configured to fit into a respective one of the slots in the endwalls of the face portion. The accessory shell is configured to flex such that the first and second shell endwalls are displaced outwardly when the accessory shell is pressed onto the face portion of the housing.

Other aspects of the present disclosure are directed to a circuit breaker cap for labeling a circuit breaker. The circuit breaker has a housing with a raised portion through which extends a handle. The raised portion has a top surface extending between and connecting a pair of endwalls and a pair of sidewalls. A respective slot is formed in each of the endwalls. The circuit breaker cap includes a single-piece shell with a lid that is integrally formed with first and second opposing and generally parallel endwalls and first and second opposing and generally parallel sidewalls. The shell sidewalls and endwalls project from the lid and cooperatively form a continuous surface configured to circumscribe the raised portion of the circuit breaker. The circuit breaker cap also includes first and second tabs. The first tab is integrally formed with and projects from an inside surface of the first endwall towards the second endwall. Likewise, the second tab is integrally formed with and projects from an inside surface of the second endwall towards the first endwall. The first and second tabs are each configured to fit into a respective one of the slots in the endwalls of the raised portion and thereby attach the shell to the circuit breaker housing. A handle slot is formed in the lid and configured to receive therethrough the handle of the circuit breaker. The shell is configured to flex outwardly such that the first endwall and tab are deflected away from the second endwall and tab by the endwalls of the raised portion when the shell is pressed onto the raised portion of the circuit breaker housing.

Additional aspects of this disclosure are directed to a labeling kit for labeling a plurality of circuit breakers mounted to a panelboard in an electrical distribution panel. Each of the circuit breakers includes a housing having a raised portion with a top surface extending between and connecting a pair of opposing endwalls. A respective slot is formed in each of the endwalls. The labeling kit includes, inter alia, a container and a plurality of circuit breaker caps stowed in the container. Each of the circuit breaker caps is integrally formed as a single-piece unitary structure, which includes a lid, first and second endwalls projecting from opposing ends of the lid, and first and second tabs each projecting from an inside surface of a respective one the cap endwalls. The first and second tabs are each configured to fit into a respective one of the slots in the endwalls of the raised portion and thereby attach the cap to the housing of a respective one of the circuit breakers. Each of the caps includes one (or more) of a plurality of indicia that is integrally formed with the lid. Each of the indicium visibly portrays a corresponding characteristic of the respective circuit breaker to which the cap is attached. In one non-limiting example, each of the indicium is a color of a color code which is indicative of the electrical circuit to which the respective circuit breaker is electrically connected. In another non-limiting example, each of the indicium is an embossed word or symbol, or both, indicative of the electrical circuit to which the respective circuit breaker is electrically connected.

The above summary is not intended to represent each embodiment or every aspect of the present disclosure. Rather, the foregoing summary merely provides an exemplification of some of the novel and inventive features included herein. The above features and advantages, and other features and advantages of the present disclosure, will be readily apparent from the following detailed description of the embodiments and best modes for carrying out the present invention when taken in connection with the accompanying drawings and appended claims.

DETAILED DESCRIPTION

Figure 1:
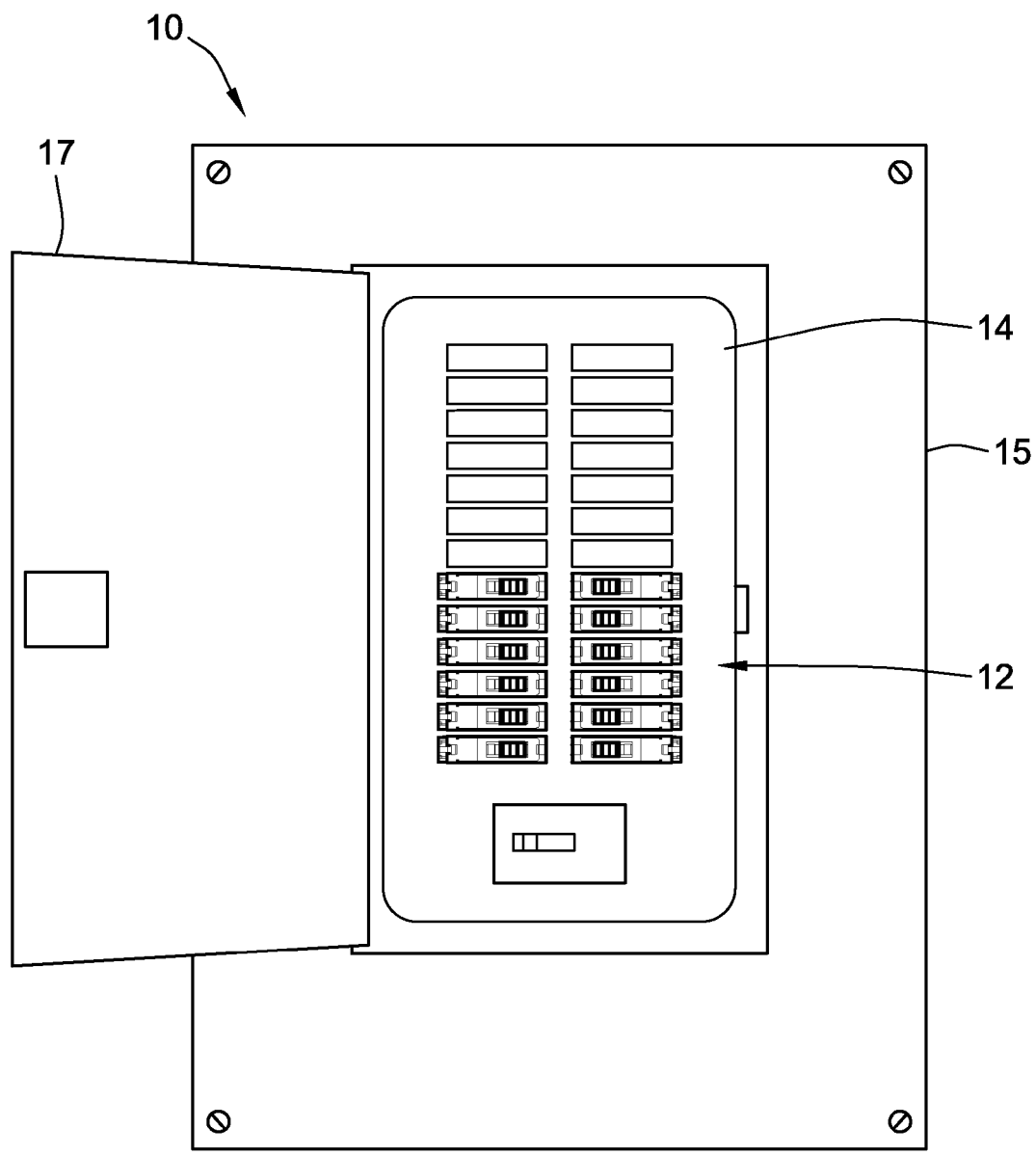
FIG. 1 is a perspective-view illustration of an exemplary circuit breaker panelboard in accordance with aspects of the present disclosure.

Referring now to the drawings, wherein like reference numerals refer to like components throughout the several views, there is shown in FIG. 1 an exemplary electrical distribution panel assembly, designated generally at 10, with a panelboard 14. The electrical distribution panel assembly 10 includes a protective housing 15. The housing 15 can be made of a variety of materials including metal, plastic, fiberglass, and the like. The housing 15 can includes a hinged door 17 or other means of sealing and/or covering all of or some of the contents of the electrical distribution panel assembly 10.

One or more electrical switch devices 12 are mounted on or otherwise operatively attached to the panelboard 14. In the illustrated embodiment, the electrical switch device 12 is shown as a circuit breaker, which may be in the nature of a Square D® 32635 20A Single-Pole Circuit Breaker, available from Schneider Electric USA, Inc., of Palatine, Ill., USA. Incidentally, the electrical distribution panel 10 may be in the nature of an NQOD breaker panelboard, numerous variations of which are also available from Schneider Electric USA, Inc. The inventive aspects of this disclosure, however, are not per se limited to the illustrated application. For instance, the distribution panel 14 can include any number and assortment of circuit breakers, such as is typically found in a residential load center. In the same vein, the electrical switch device 12 can take on various alternative forms, such as electrical isolators and the like, without departing from the intended scope and spirit of the present disclosure. Moreover, only selected components of the electrical distribution panel 10 have been shown and will be described in additional detail hereinbelow. Nevertheless, the electrical distribution panels discussed herein can include numerous additional and alternative components, such as distributed phase bussing, fuse assemblies, sensor assemblies, and other well-known peripheral components, for example. Seeing as these components are well known in the art, they will not be described in further detail. Lastly, the drawings presented herein are not necessarily to scale and are provided purely for descriptive purposes; thus, the specific and relative dimensions shown in the drawings are not to be considered limiting.

Figure 2:
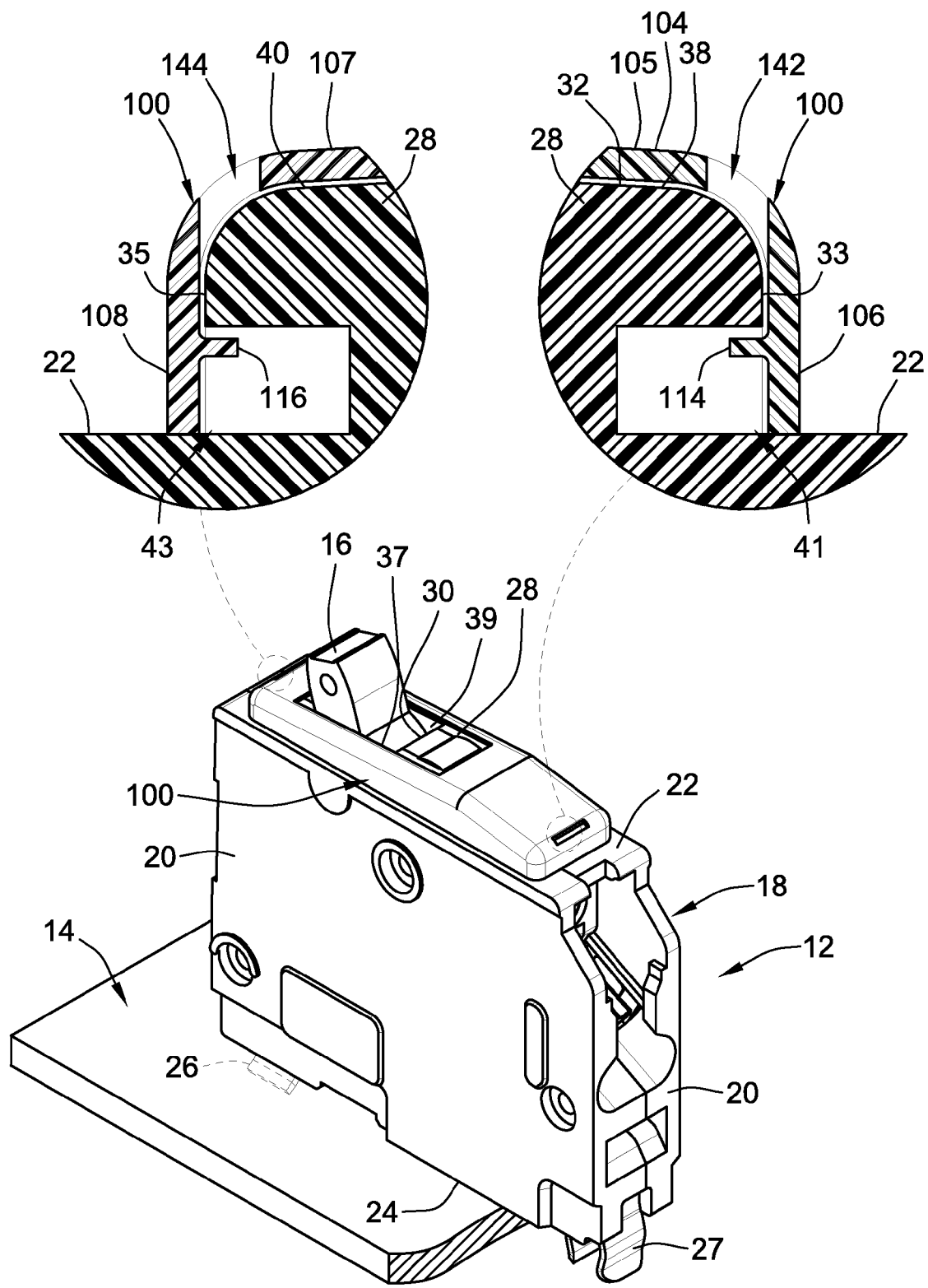
FIG. 2 is a perspective-view illustration of an exemplary circuit breaker labeling cap in accordance with aspects of the present disclosure, the exemplary circuit breaker labeling cap shown operatively attached to a representative circuit breaker.

The circuit breaker 10 shown in FIG. 2 has a movable switch (or "handle") 16 extending outwardly from a molded plastic housing 18. The housing 18 has four housing sidewalls 20 (only two of which are visible in FIG. 2) connected with a housing front face 22 and a housing rear face 24 to collectively form a generally rectangular cartridge. A phase stab 26 and a neutral line jaw 27 protrude from opposite ends of the rear face 24 of the breaker housing 18, electrically coupling the circuit breaker 12 to a phase busbar and a neutral busbar (neither of which is shown). A raised portion 28 protrudes from the front face 22 of the breaker housing 18. Optionally, an elevated or raised portion can be omitted and substituted with a contoured face portion. As seen in the two inset views of FIG. 2, the raised portion 28 of the breaker housing 18 includes a top surface 32 extending between and connecting a pair of opposing, generally parallel endwalls 33 and 35. A recessed slot 41 and 43 is formed in the base of each of the endwalls 33, 35, respectively. The top surface 32 also extends between and connects a pair of opposing, generally parallel sidewalls 37 and 39 which, in conjunction with the endwalls 33, 35, form a generally continuous, rectangular periphery of the raised portion 28. The handle 16 projects through a slot 30 in the top surface 32 of the raised portion 28. As is known, the handle 16 is movable between an active/closed ON position and an inactive/open OFF position.

Figure 3:
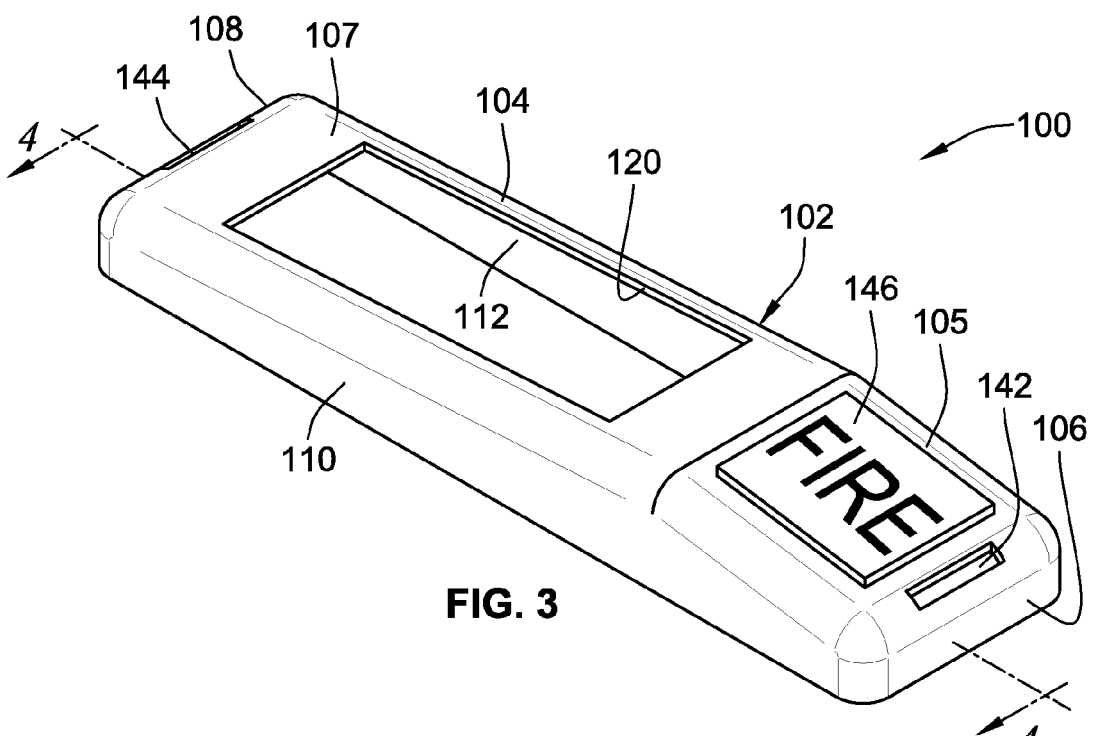
FIG. 3 is a perspective-view illustration of the circuit breaker labeling cap of FIG. 1.
Figure 4:
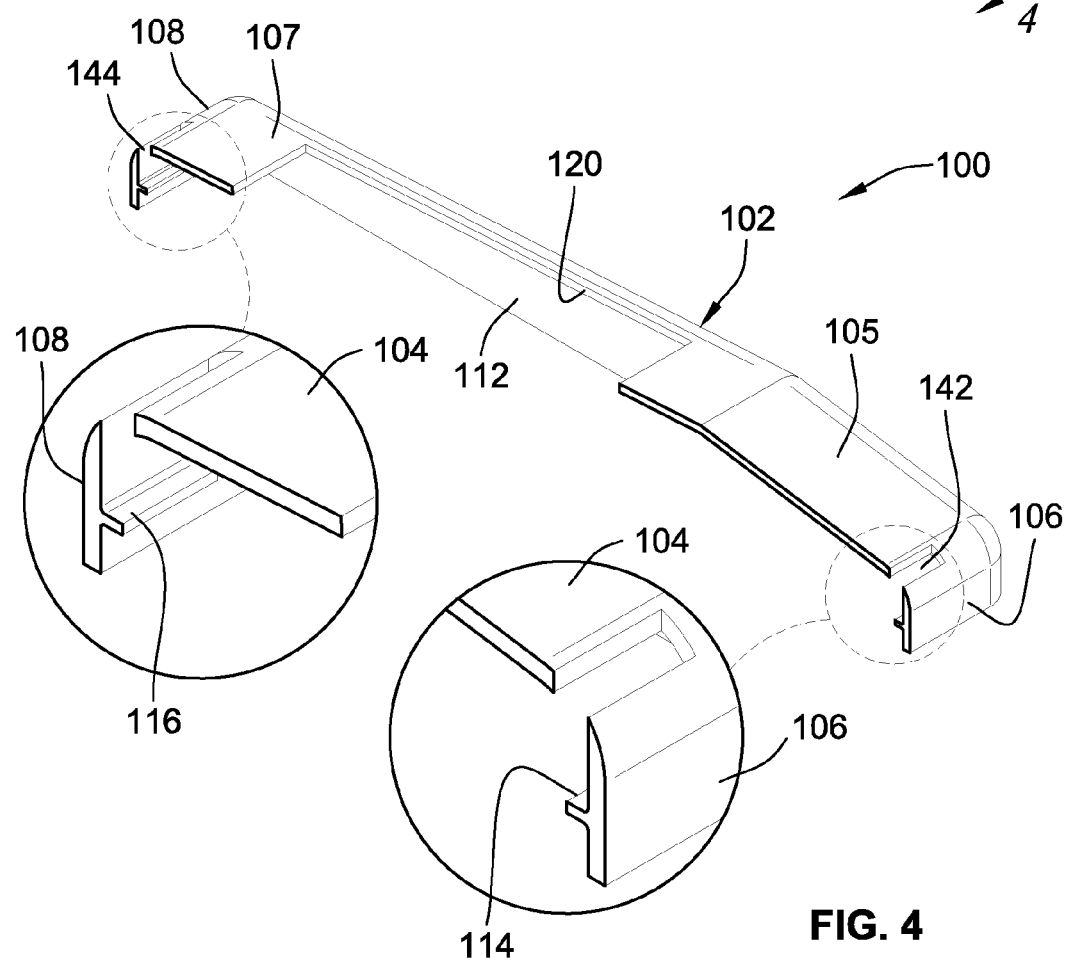
FIG. 4 is a cutaway perspective-view illustration of the circuit breaker labeling cap of FIG. 1 sectioned along line 3-3 of FIG. 2.

In accord with the disclosed concepts, the electrical distribution panel 10 is provided with one or more identification accessories, one of which is shown designated generally as 100 in FIGS. 2-4, for identifying one or more of the electrical switch devices in the distribution panel 10. As an extension of the above example, the identification accessory 100 of FIG. 2 is a circuit breaker cap 100 for labeling the circuit breaker 12. The circuit breaker cap 100 includes a unitary, single-piece (accessory) shell, generally labeled as 102 in FIG. 2, with a lid 104 that is integrally formed with first and second opposing, generally parallel endwalls 106 and 108, respectively, and first and second opposing, generally parallel sidewalls 110 and 112, respectively. The shell endwalls 106, 108 are also shown integrally formed with the shell sidewalls 110, 112, all of which project downward from the lid 104 and cooperatively form a continuous surface or rim that is configured (e.g., shaped and sized) to circumscribe the rectangular periphery of the raised portion 28 of the circuit breaker 12. In alternative embodiments, the accessory shell 102 could take on different shapes and sizes, and could be fabricated as an assemblage of interconnected segments. Rather than attaching directly to a breaker 12, an optional embodiment of the identification accessory 100 clips to the face plate electrical distribution panel assembly 10 over the breaker 12.

An elongated switch (or "handle") slot 120 is formed through the lid 112. When the cap 100 is attached to the circuit breaker 12, as seen in FIG. 2, the breaker switch 16 passes through the handle slot 120. It is generally desirable that the handle slot 120 be sufficiently long such that the circuit breaker cap 100 does not interfere with movement of the switch 16 during normal operation of the circuit breaker 12. The elongated handle slot 120, in optional configurations, is large enough so as to not visibly obstruct required information printed on the top surface 32 of the raised portion 28. Printed indicia, such as amperage ratings and operational state, are typically provided on the top surface 32, where such indicia will be left readily viewable by the user. Optionally, the cap 100 can be fabricated from a semi-transparent material such that the foregoing information is viewable through the cap 100.

Turning to FIG. 4, namely the two inset views provided therein, a first elongated tab 114 is integrally formed with and projecting generally orthogonally from the inside surface of the first shell endwall 106 towards the second shell endwall 108. Similarly, a second elongated tab 116 is integrally formed with and projecting generally orthogonally from the inside surface of the second shell endwall 108 towards the first shell endwall 106. In some embodiments, the first and second tabs 114, 116 are parallel and, optionally, generally coplanar with each other. Each of the tabs 114, 116 is configured to fit into a respective one of the recessed slots 41, 43 in the endwalls 33, 35 of the raised portion 28. Once inserted into the slots 41, 43, the tabs 114, 116 attach the shell 102 and, thus, the circuit breaker cap 100 to the circuit breaker housing 12. In the illustrated embodiment, the bottom edge of each shell endwall 106, 118 abuts the top surface 22 of the breaker housing 18. In so doing, inadvertent removal of the circuit breaker cap 100 can be minimized or prevented.

The accessory 100 can be made from a variety of materials (e.g., metals, plastics, etc.) and different methods (e.g., molded, stamped, etc.). By way of non-limiting example, the accessory shell 102 embodied in FIG. 3, including the lid 104, shell endwalls 106, 108, shell sidewalls 110, 112, and shell tabs 114, 116 are integrally formed as a single-piece, unitary structure, which may preferably be formed from an electrically non-conductive (i.e., electrically insulating) material, such as polyethylene terephthalate (PET), polypropylene, polyolefins, rubber-like polymers, as a few examples. The electrically non-conductive material helps to ensure the safety of the installer while attaching the circuit breaker cap 100 to the circuit breaker 12.

It is desirable, in some embodiments, for the shell 102 to include or be fabricated from an elastic, readily bendable material such that the entire shell 102 or, optionally, just the shell endwalls 106, 108 and/or sidewalls 110, 112 are displaced outwardly when the accessory shell 102 is pressed onto the face portion 28 of the breaker housing 18. For instance, the shell 102 can be configured to bend and/or flex such that the first endwall and tab 108, 114 are deflected outwardly, away from the second endwall and tab 110, 116, and vice versa, by the endwalls 33, 35 of the raised portion 28 when the shell 102 is pressed onto the raised portion 28 of the breaker housing 18. Once the tabs 114, 116 clear the endwalls 33, 35, the elastic nature of the shell 102 will urge the tabs 114, 116 into the recessed slots 41 and 43. In so doing, the circuit breaker cap 100 operates to "snap-fit" onto the front face 22 of the breaker housing 18.

This exemplary design eliminates the need for additional adhesives and/or fasteners to connect the circuit breaker cap 100 to the circuit breaker 12. Nevertheless, the present invention does not preclude providing the circuit breaker cap 100 with attachment means such as an adhesive, double-sided tape, threaded fasteners, friction-interference fitting, bendable non-resilient tabs, or other fastening means for attaching the circuit breaker cap 100 to the circuit breaker 12. In a similar regard, the circuit breaker cap 100 is generally not intended to provide a means for mounting or securing the circuit breaker 12 to the panelboard 14. As such, the accessory shell 102 can be characterized, in at least some embodiments, by a lack of structure for attaching the circuit breaker cap 100 directly to the panelboard 14. In an alternate arrangement, the elongated tabs 114, 116 could be reversed to project from an outside surface of the shell endwalls 106, 108 and fit into a gap between the cap 100 and circuit breaker 12 and thereby "snap" into place in installed base.

In some embodiments, one or more indicia 146 are integrally formed with the accessory shell 102. Each indicium 146 is designed to visibly portray a characteristic of the electrical switch device to which the identification accessory 100 is mounted. According to the non-limiting example of FIG. 3, the indicium 146 is an embossed word (e.g., FIRE) that identifies the electrical circuit to which the respective circuit breaker 12 is electrically connected. Optionally, the indicia 146 can include other indicia, such as pre-printed information, color-coding, etc., as will be developed in further detail below with respect to FIG. 5.

The circuit breaker cap 100 can be contoured to match the shape of the raised portion 28 of the circuit breaker 12. With reference to FIGS. 2 and 3, for example, the lid 104 includes a first inclined segment 105 juxtaposed with and extending at an oblique angle from a second inclined segment 107. The first inclined segment 105 also extends at an oblique angle from the first shell endwall 106, whereas the second inclined segment 107 extends at an oblique angle from the second shell endwall 108. The top surface 32 of the raised portion 28 includes a pair of oblique top surfaces 38 and 40, as seen in the two inset views of FIG. 2. The angle of inclination between the first and second inclined segments 105, 107 may be substantially equal to the angle of inclination between the oblique top surfaces 38, 40 such that, when the circuit breaker cap 100 is operatively attached to the circuit breaker 12, the first inclined segment 105 of the lid 104 lays generally flush against the first oblique surface 38 of the face portion 28, whereas the second inclined segment 107 lays generally flush against the second oblique surface 40 of the face portion 28.

The accessory shell 102 can also be provided with one or more tool slots, such as the first transversely oriented tool slot 142 located between the first inclined segment 105 and the first shell endwall 106, and the second transversely oriented tool slot 144 located between the second inclined segment 107 and the second shell endwall 108. Each of the tool slots 142, 144 is configured to receive therein a tool or similar implement, such as the flat head of a slotted screw driver (e.g., tool 210 of FIG. 5). By pressing the screw driver head into one of the tool slots 142, 144, the tool slides between and displaces one of the shell endwalls 106, 108 outwardly, away from one of the face portion endwalls 33, 35 thereby facilitating in the removal of the accessory shell 102 from the face portion 28 of the breaker housing 18.

Figure 5:
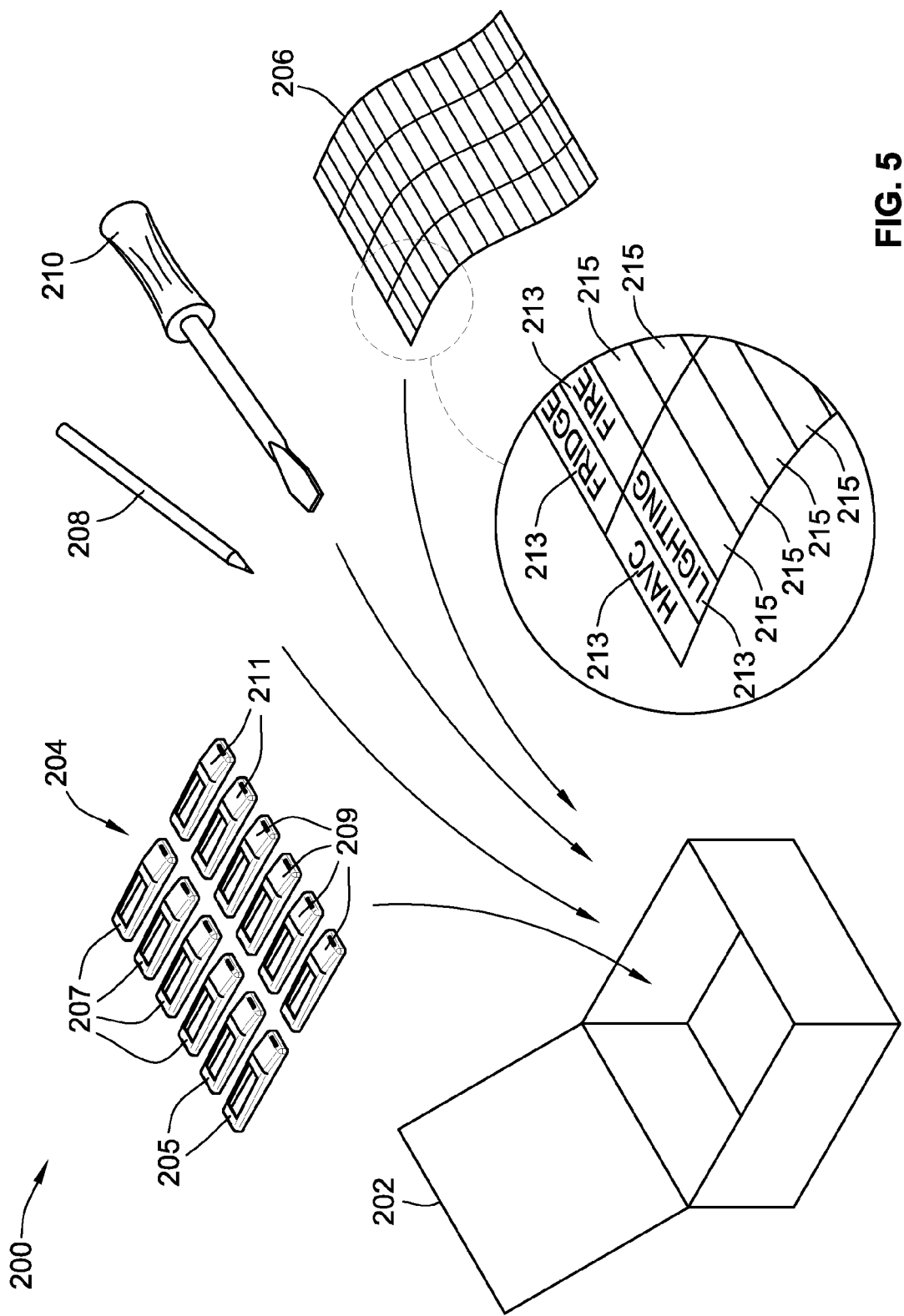
FIG. 5 is a perspective-view illustration of a circuit breaker labeling kit in accordance with aspects of the present disclosure.

FIG. 5 is a perspective-view illustration of a circuit breaker labeling kit 200 for labeling circuit breakers mounted in an electrical distribution panel, such as the electrical distribution panel 10 and circuit breaker(s) 12 of FIG. 1. The labeling kit 200 of FIG. 5 includes a container 202 configured to stow therein a plurality of circuit breaker caps 204. Each of the circuit breaker caps 204 of FIG. 5 may be structurally similar to the identification accessory 100 described above with respect to FIGS. 1-4; thus, the caps 204 can include any of the features, options, and alternatives of the identification accessory 100. For example, each of the circuit breaker caps 204 are shown in FIG. 5 as integrally formed, single-piece, unitary structures.

Likewise, each of the circuit breaker caps 204 is integrally formed with one or more of a plurality of indicia. Each of these indicium visibly portrays a corresponding characteristic of the respective circuit breaker to which the cap 204 is attached. In the illustrated embodiment, for example, each of the indicium is a color of a color code indicative of a circuit to which the respective circuit breaker is electrically connected. For example, caps 205 can be colored red to indicate a critical line, such as emergency lighting, fire systems, backup generators, etc., whereas caps 207 may be colored green to indicate semi-critical lines, such as lighting, HVAC, etc., and caps 209 can be colored blue to indicate non-critical lines. One or more "blank" or white-colored caps 211 could also be provided. As indicated above, the indicia may take on addition and/or alternative forms, such as an embossed word or symbol, or both, indicative of a circuit to which the respective circuit breaker is electrically connected (e.g., lighting circuits, receptacle circuits, refrigerator, etc.)

The labeling kit 200 of FIG. 5 may also include other optional features, such as a sheet of labels 206, which may include pre-printed labels 213 and blank labels 215 (see inset view of FIG. 5). Other optional features may include a pen 208 for marking the blank labels 215, and a tool 210 for facilitating removal of the circuit breaker caps 204, as described above. Additional and alternative features can also be included in the labeling kit 200 of FIG. 5 within the scope and spirit of the present disclosure.

While exemplary embodiments and applications of the present disclosure have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. An identification accessory for identifying an electrical switch device, the electrical switch device having a housing with a face portion and a handle projecting from the face portion, the identification accessory comprising:
    an accessory shell with a lid having first and second endwalls projecting from the lid, the accessory shell being configured to attach to the electrical switch device, the lid including indicium for placement in proximity to the handle of the electrical switch device,
    wherein the accessory shell further comprises first and second sidewalls projecting from the lid, the shell sidewalls being connected to the shell endwalls thereby cooperatively forming a continuous surface configured to extend around the face portion of the housing, the continuous surface comprising a continuous rim.

2. The identification accessory of claim 1, wherein the accessory shell is integrally formed as a single-piece unitary structure.

3. The identification accessory of claim 1, wherein the face portion of the electrical switch device has a top surface extending between a pair of endwalls, each of the endwalls forming a respective slot, and wherein the accessory shell further includes a first tab projecting from an inside surface of the first endwall, and a second tab projecting from an inside surface of the second endwall, the first and second tabs each being configured to fit into a respective one of the slots in the endwalls of the face portion.

4. The identification accessory of claim 3, wherein the shell is configured to flex such that the first and second endwalls are displaced outwardly when the accessory shell is pressed onto the face portion of the housing.

5. The identification accessory of claim 4, wherein the accessory shell further comprises one or more tool slots configured to receive therein a tool such that movement of the received tool displaces one of the shell endwalls away from one of the face portion endwalls thereby allowing for removal of the accessory shell from the face portion of the housing.

6. The identification accessory of claim 1, wherein the lid of the accessory shell forms a handle slot configured to receive therethrough the handle when the accessory shell is pressed onto the face portion of the housing.

7. The identification accessory of claim 1, wherein the lid includes a first inclined segment extending obliquely from a second inclined segment.

8. The identification accessory of claim 1, wherein the indicium is integrally formed with the accessory shell, the indicium visibly portraying a characteristic of the electrical switch device.

9. The identification accessory of claim 1, wherein the accessory shell is characterized by a lack of structure for attaching the identification accessory directly to a panelboard mounting surface.

10. A circuit breaker cap for labeling a circuit breaker having a housing with a raised portion through which extends a switch, the raised portion having a top surface extending between and connecting a pair of endwalls and a pair of sidewalls, each of the endwalls forming a respective slot, the circuit breaker cap comprising:
    a single-piece shell with a lid integrally formed with first and second opposing and generally parallel endwalls and first and second opposing and generally parallel sidewalls, the shell sidewalls and endwalls projecting from the lid and cooperatively forming a continuous surface configured to circumscribe the raised portion of the circuit breaker;
    first and second tabs, the first tab being integrally formed with and projecting from an inside surface of the first endwall towards the second endwall, the second tab being integrally formed with and projecting from an inside surface of the second endwall towards the first endwall, the first and second tabs each being configured to fit into a respective one of the slots in the endwalls of the raised portion and thereby attach the shell to the circuit breaker housing; and
    a handle slot formed in the lid and configured to receive therethrough the switch,
    wherein the shell is configured to flex outwardly such that the first endwall and the first tab are deflected away from the second endwall and the second tab by the pair of endwalls when the shell is pressed onto the raised portion of the circuit breaker housing, the continuous surface comprising a continuous rim.

11. A labeling kit for labeling a plurality of circuit breakers mounted to a panelboard in an electrical distribution panel, each of the circuit breakers including a housing having a raised portion with a top surface extending between and connecting a pair of opposing endwalls, and a respective slot formed in each of the endwalls, the labeling kit comprising:
    a container; and
    a plurality of circuit breaker caps stowed in the container, each of the circuit breaker caps being integrally formed as a single-piece unitary structure including:
        a lid;
        first and second endwalls projecting from opposing ends of the lid;
        first and second tabs each projecting from an inside surface of a respective one the cap endwalls, the first and second tabs each being configured to fit into a respective one of the slots in the endwalls of the raised portion and thereby attach the cap to the housing of a respective one of the circuit breakers; and one or more of a plurality of indicia integrally formed with the lid, each of the indicium visibly portraying a corresponding characteristic of the respective circuit breaker to which the cap is attached, wherein each of the circuit breaker caps further comprises first and second endwalls integrally formed with and projecting from opposing sides of the lid, the cap sidewalls and endwalls cooperatively forming a continuous surface configured to extend around the raised portion of the circuit breaker housing, the continuous surface comprising a continuous rim.

12. The labeling kit of claim 11, wherein each of the indicium is a color of a color code indicative of a circuit to which the respective circuit breaker is electrically connected.

13. The labeling kit of claim 11, wherein each of the indicium is an embossed word or symbol, or both, indicative of a circuit to which the respective circuit breaker is electrically connected.

14. The labeling kit of claim 11, wherein the cap is configured to flex such that the first and second endwalls of the cap are deflected outwardly by the pair of opposing endwalls of the circuit breaker housing when the cap is pressed onto the raised portion of the housing.

15. The labeling kit of claim 11, wherein the circuit breaker cap is formed from an electrically non-conductive material.

16. The labeling kit of claim 11, wherein the electrical switch device includes a switch projecting through the raised portion of the housing, the lid of the accessory shell forming a handle slot configured to receive therethrough the switch when the cap is pressed onto the raised portion of the circuit breaker housing.

17. The labeling kit of claim 11, wherein the top surface of the raised portion includes a pair of oblique surfaces, and wherein the lid includes a first surface extending obliquely from a second surface, the first and second surfaces of the lid each being configured to lie generally flush against a respective one of the oblique surfaces of the raised portion.

18. The labeling kit of claim 11, wherein the plurality of circuit breaker caps are each characterized by a lack of structure for attaching the cap directly to the panelboard in the electrical distribution panel.

19. A system for identifying an electrical switch device comprising:

an electrical switch device having a housing with a face portion and a handle projecting from the face portion; and an identification accessory to identify an electrical switch device, the identification accessory comprising:

an accessory shell with a lid having first and second endwalls projecting from the lid, the accessory shell being configured to attach to the electrical switch device, the lid including indicium for placement in proximity to the handle of the electrical switch device, wherein the accessory shell further comprises first and second sidewalls projecting from the lid, the shell sidewalls being connected to the shell endwalls thereby cooperatively forming a continuous surface configured to extend around and circumscribe the face portion of the housing, the continuous surface comprising a continuous rim.

* * * * *